(12) United States Patent
Zhang (10) Patent No.: US 12,304,545 B2
(45) Date of Patent: May 20, 2025

(54) ELECTRIC GOLF TROLLEY

(71) Applicant: NINGBO WENTAI SPORT EQUIPMENT CO., LTD., Zhejiang (CN)

(72) Inventor: Sheng Zhang, Zhejiang (CN)

(73) Assignee: NINGBO WENTAI SPORT EQUIPMENT CO., LTD., Zhejiang (CN)

( * ) Notice: Subject to any disclaimer, the term of this patent is extended or adjusted under 35 U.S.C. 154(b) by 340 days.

(21) Appl. No.: 18/071,564

(22) Filed: Nov. 29, 2022

(65) Prior Publication Data

US 2024/0051590 A1    Feb. 15, 2024

(30) Foreign Application Priority Data

Aug. 15, 2022   (CN) .......................... 202222146776.7

(51) Int. Cl.
*B62B 3/02* (2006.01)
*B62B 3/10* (2006.01)
*B62B 5/00* (2006.01)

(52) U.S. Cl.
CPC .............. *B62B 3/022* (2013.01); *B62B 3/102* (2013.01); *B62B 5/0043* (2013.01); *B62B 5/0053* (2013.01); *B62B 2202/404* (2013.01)

(58) Field of Classification Search
CPC .. B62B 3/02; B62B 3/12; B62B 3/102; B62B 5/0036; B62B 5/0053; B62B 5/0022
See application file for complete search history.

(56) References Cited

U.S. PATENT DOCUMENTS

| | | | | |
|---|---|---|---|---|
| 5,161,635 A | * | 11/1992 | Kiffe | B60L 3/04 |
| | | | | 280/DIG. 6 |
| 5,857,684 A | * | 1/1999 | Liao | B60L 50/66 |
| | | | | 280/DIG. 6 |

(Continued)

FOREIGN PATENT DOCUMENTS

| | | |
|---|---|---|
| DE | 202016002729 | 5/2016 |
| EP | 1600352 | 11/2005 |

OTHER PUBLICATIONS

"Office Action of Canada Counterpart Application", issued on Nov. 29, 2024, p. 1-p. 4.

*Primary Examiner* — Jeffrey J Restifo
(74) *Attorney, Agent, or Firm* — JCIPRNET (57) ABSTRACT

An electric golf trolley Includes an electric actuator includes a motor controller, two planetary gear reduction motors connected to the motor controller and mounted on two rear wheel modules in a one-to-one correspondence manner, and a power supply connected to the motor controller. A connecting-rod link mechanism is disposed between an upper frame module, a lower frame module and the two rear wheel modules. When folded towards the lower frame module, the upper frame module drives the rear wheel modules through the connecting-rod link mechanism to be folded synchronously. The motor controller is mounted on the upper or lower frame module. The power supply is mounted on the upper or lower frame module. The rear wheel modules are separately driven by the planetary gear reduction motors, so a spindle rotating synchronously along with the rear wheel modules does not need to be additionally disposed between the rear wheel modules.

4 Claims, 12 Drawing Sheets

(56) References Cited

U.S. PATENT DOCUMENTS

| | | | | |
|---|---|---|---|---|
| 6,481,518 | B1* | 11/2002 | Wu | B60K 7/0007 280/DIG. 6 |
| 7,021,408 | B2 | 4/2006 | Fricker | B60L 50/60 280/DIG. 6 |
| 7,063,340 | B1* | 6/2006 | Wu | B62B 3/12 280/47.24 |
| 7,137,644 | B2* | 11/2006 | Kimberley | A63B 55/60 280/654 |
| 7,237,632 | B2* | 7/2007 | Liao | B62B 5/0046 180/68.5 |
| 8,226,112 | B2* | 7/2012 | Liao | B62B 3/12 280/DIG. 6 |
| 8,282,121 | B2* | 10/2012 | Lin | B62B 3/12 280/DIG. 6 |
| 8,292,321 | B2* | 10/2012 | Liao | B62B 3/02 280/651 |
| 8,365,850 | B2* | 2/2013 | Gal | B62K 3/002 180/209 |
| 8,366,140 | B2* | 2/2013 | Wu | B62B 3/02 280/DIG. 6 |
| 8,393,633 | B2* | 3/2013 | Liao | B62B 3/02 280/DIG. 6 |
| 8,480,098 | B2* | 7/2013 | Liao | B62B 3/02 280/47.28 |
| 8,720,912 | B2* | 5/2014 | Liao | A63B 55/60 280/47.24 |
| 8,820,775 | B2* | 9/2014 | Wang | A63B 55/60 280/DIG. 6 |
| 8,820,776 | B2* | 9/2014 | Wang | A63B 55/60 280/651 |
| 9,004,505 | B1* | 4/2015 | Wu | B62B 3/022 280/38 |
| 9,211,898 | B2* | 12/2015 | Stewart | B62B 3/12 |
| 9,381,931 | B1* | 7/2016 | Pan | B62B 3/025 |
| 9,764,752 | B2* | 9/2017 | Liao | B62B 7/044 |
| 9,764,754 | B2* | 9/2017 | Zhang | B62B 3/02 |
| 10,016,666 | B2* | 7/2018 | Reimers | B62B 5/0053 |
| 10,322,738 | B1* | 6/2019 | Wu | B62B 5/067 |
| 10,377,402 | B2* | 8/2019 | Ho | B62B 3/106 |
| 10,494,006 | B2* | 12/2019 | Cheng | B62B 3/02 |
| 10,556,608 | B2* | 2/2020 | Cheng | B62B 3/022 |
| 10,562,557 | B2* | 2/2020 | Gong | A63B 55/60 |
| 10,577,003 | B2* | 3/2020 | Wang | B62B 3/022 |
| 10,953,905 | B2* | 3/2021 | Tse | B62B 5/005 |
| 10,967,897 | B2* | 4/2021 | Zhang | B62B 3/106 |
| 2004/0104057 | A1* | 6/2004 | Yeh | B62B 5/0026 180/19.1 |
| 2005/0252700 | A1* | 11/2005 | Kitauchi | B60L 50/66 180/65.1 |
| 2013/0026738 | A1* | 1/2013 | Liao | B62B 3/12 280/651 |
| 2013/0026739 | A1* | 1/2013 | Liao | B62B 3/02 280/651 |
| 2014/0159348 | A1* | 6/2014 | Wu | B62B 3/02 280/651 |
| 2017/0327140 | A1* | 11/2017 | Liao | B62B 7/086 |
| 2021/0009182 | A1* | 1/2021 | Ten Haaft | B62K 15/008 |
| 2023/0373547 | A1* | 11/2023 | Zhang | B62B 3/02 |
| 2024/0042293 | A1* | 2/2024 | Zhang | B62B 3/12 |
| 2024/0051590 | A1* | 2/2024 | Zhang | B62B 5/0053 |

* cited by examiner

… folded by unlocking the second locking mechanism, so the size is further reduced after the front wheel module is folded.

Compared with the prior art, the invention has the following advantages: the electric actuator is composed of the motor controller, the two planetary gear reduction motors and the power supply, the power supply is connected to the motor controller and is used for supplying power to the motor controller, the two planetary gear reduction motors are both connected to the motor controller, are mounted on the two rear wheel modules in a one-to-one correspondence manner and are used to drive the two rear wheel modules to rotate, and a connecting-rod link mechanism is disposed between the upper frame module, the lower frame module and the two rear wheel modules. When folded towards the lower frame module, the upper frame module drives the two rear wheel modules through the connecting-rod link mechanism to be folded synchronously. The motor controller is mounted on the upper frame module or the lower frame module, and the power supply is mounted on the upper frame module or the lower frame module. The two rear wheel modules are separately driven by the two planetary gear reduction motors, so a spindle rotating synchronously along with the two rear wheel modules does not need to be additionally disposed between the two rear wheel modules. When the electric golf trolley is folded, the first locking mechanism is unlocked, the handlebar is folded towards the upper frame module to push the upper frame module to draw close to the lower frame module, at this moment, the upper frame module drives the connecting-rod link mechanism to move to drive the two rear wheel modules to be folded synchronously, so that the handlebar module, the upper frame module, the lower frame module and the two rear wheel modules are folded. In the invention, the two planetary gear reduction motors are small in size and weight and low power consumption, and the handlebar module, the upper frame module, the lower frame module and the two rear wheel modules can be folded. After being folded, the electric golf trolley is small in size, easy to store and transport, low in overall weight, and low in power consumption during use.

DESCRIPTION OF THE EMBODIMENTS

The invention will be described in further detail below in conjunction with the accompanying drawings and embodiments.

Figure 1:
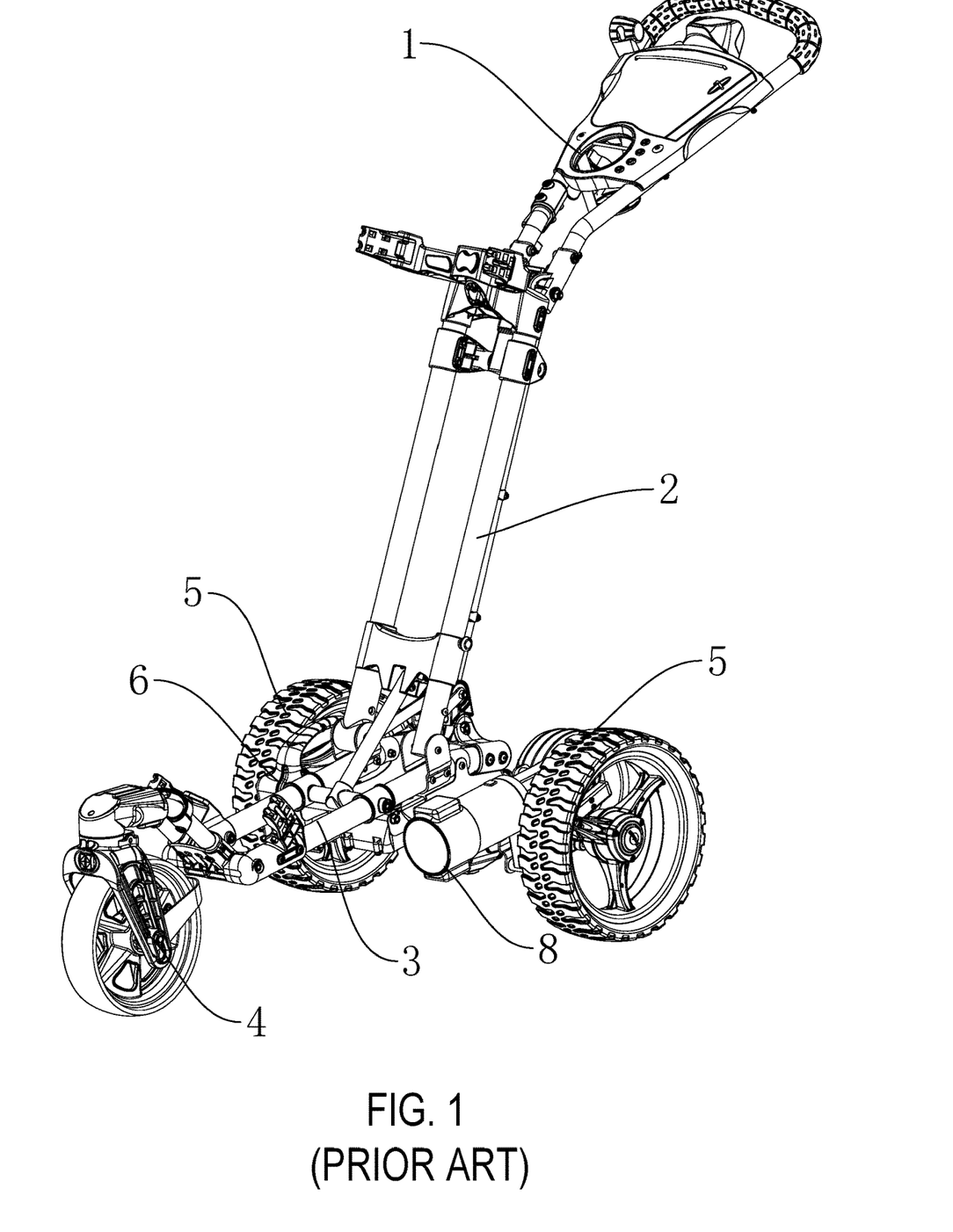
FIG. 1 is a first three-dimensional view of an existing electric golf trolley in an unfolded state.
Figure 2:
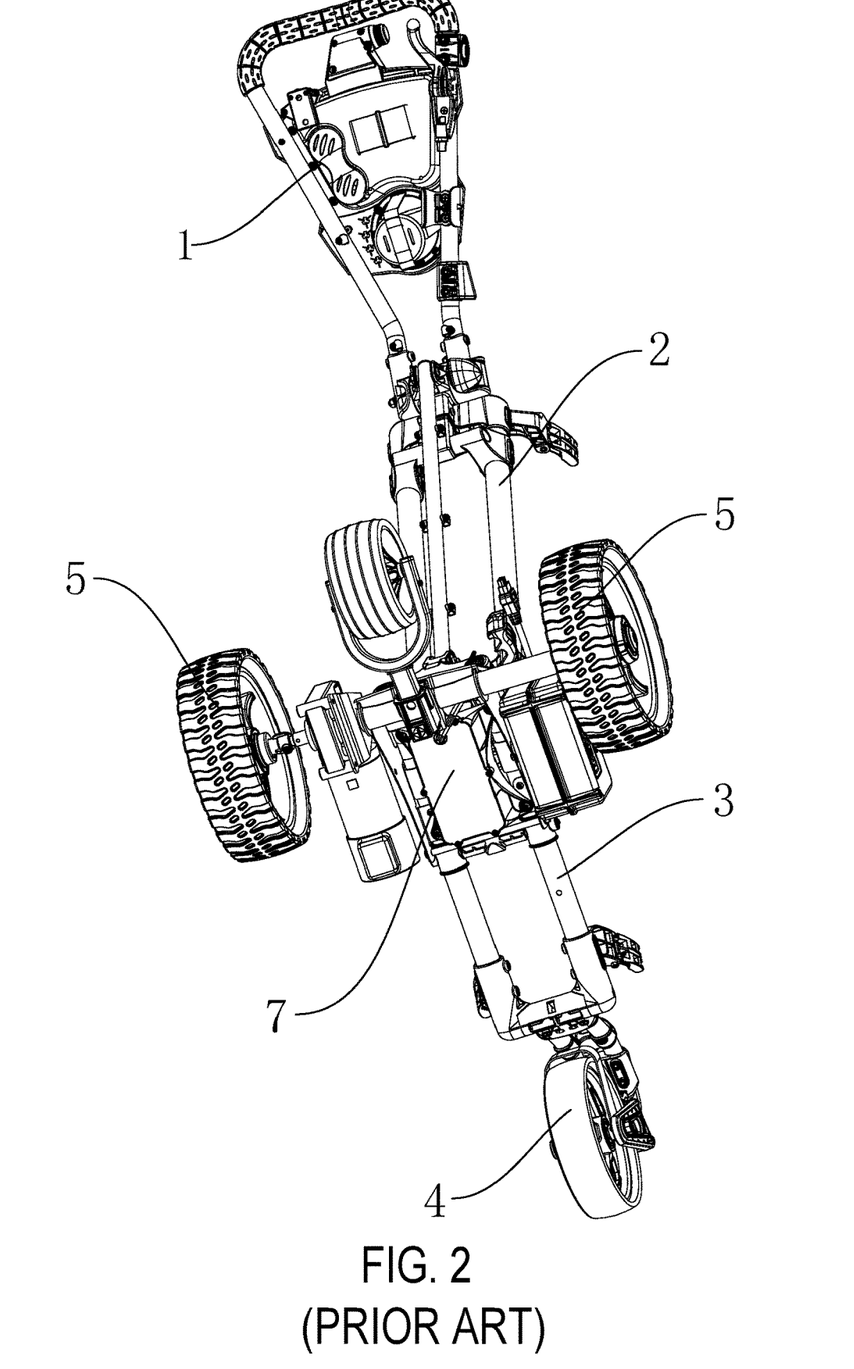
FIG. 2 is a second three-dimensional view of the existing electric golf trolley in the unfolded state.
Figure 3:
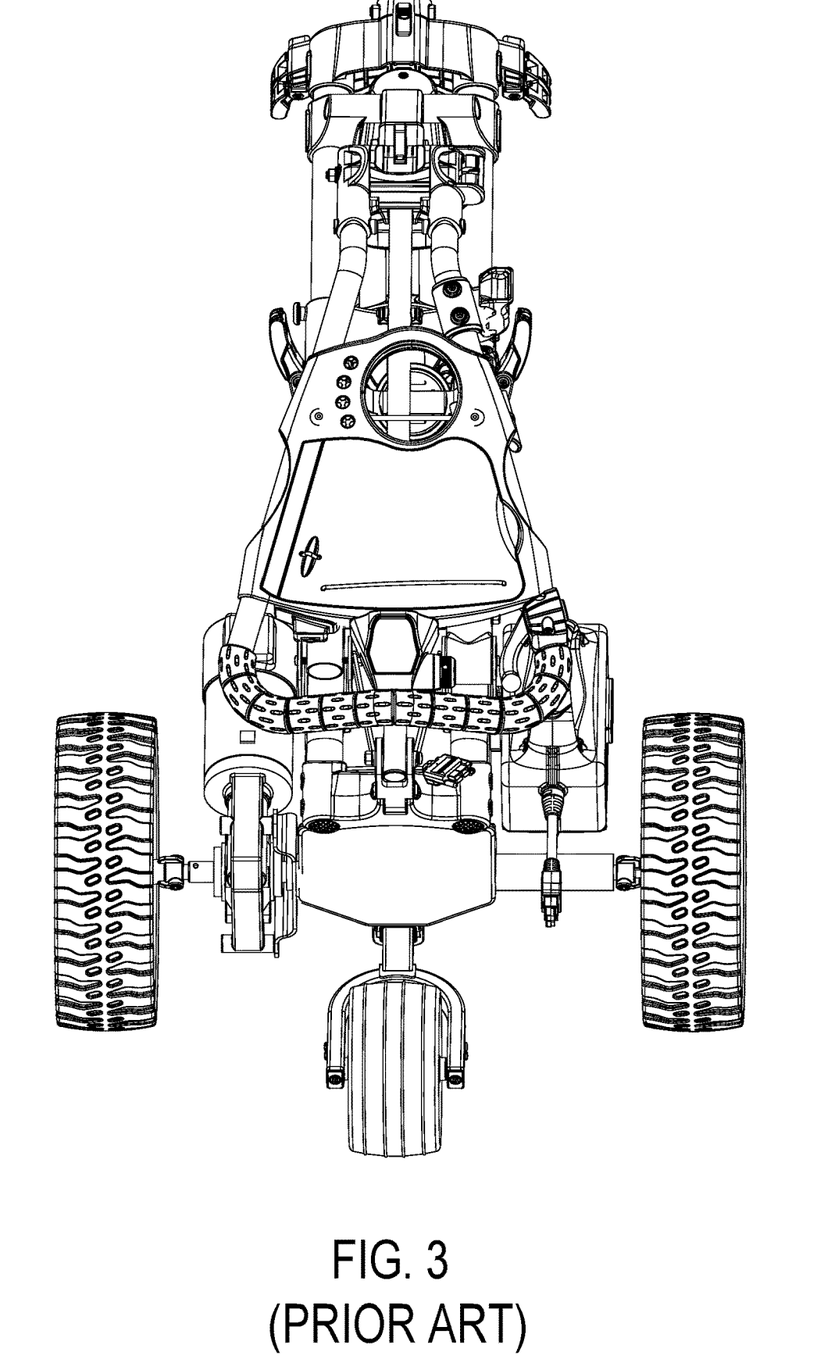
FIG. 3 is a third three-dimensional view of the existing electric golf trolley in the unfolded state.
Figure 4:
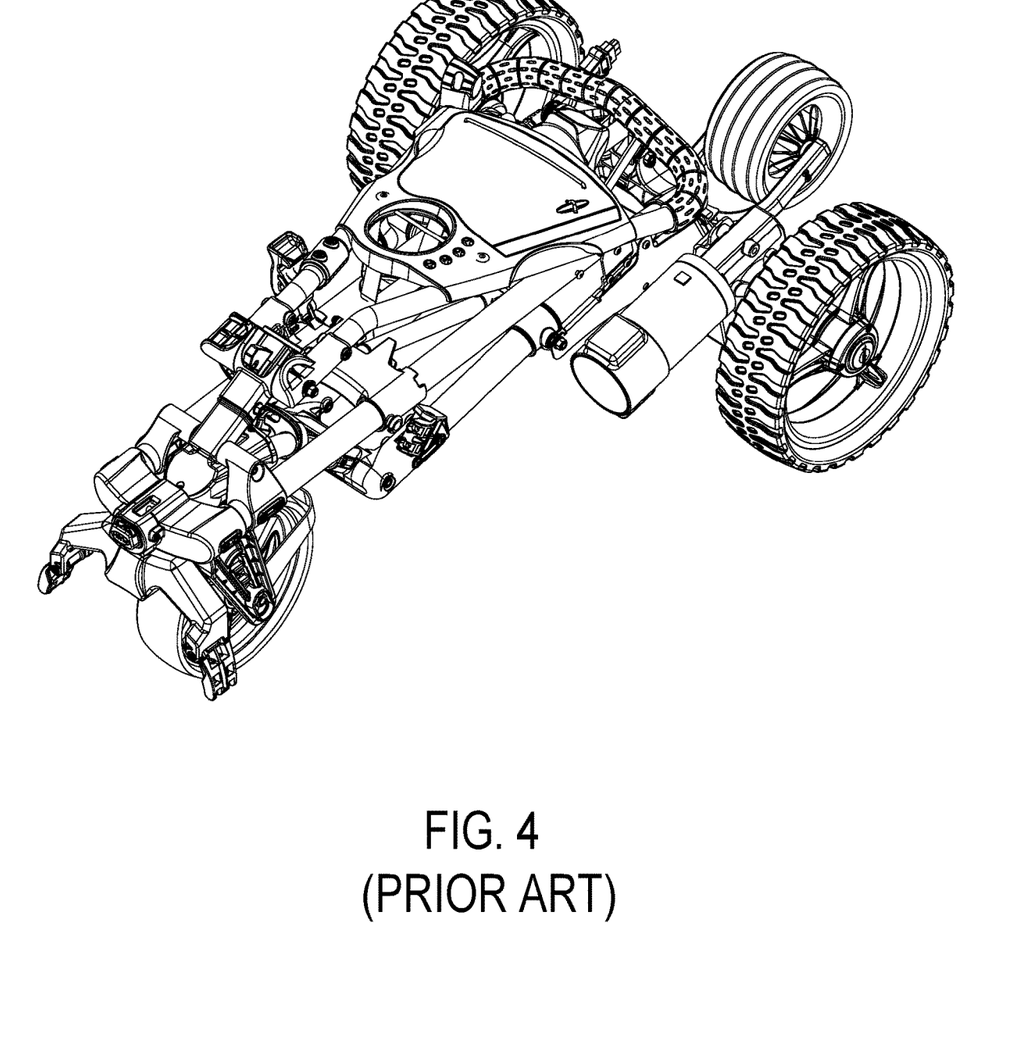
FIG. 4 is a schematic diagram of the existing electric golf trolley in a folded state.
Figure 5:
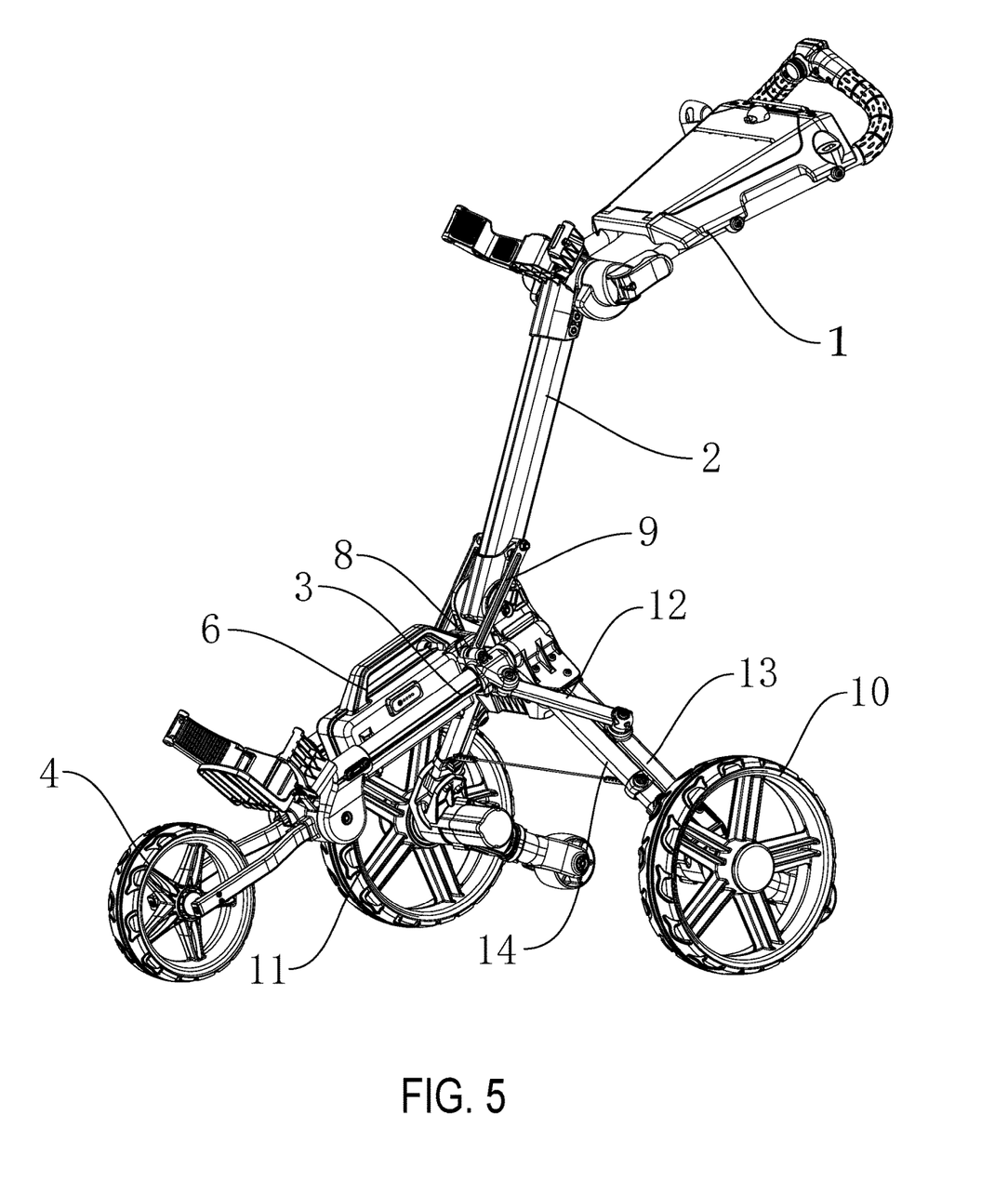
FIG. 5 is a first three-dimensional view of an electric golf trolley in an unfolded state according to the invention.
Figure 6:
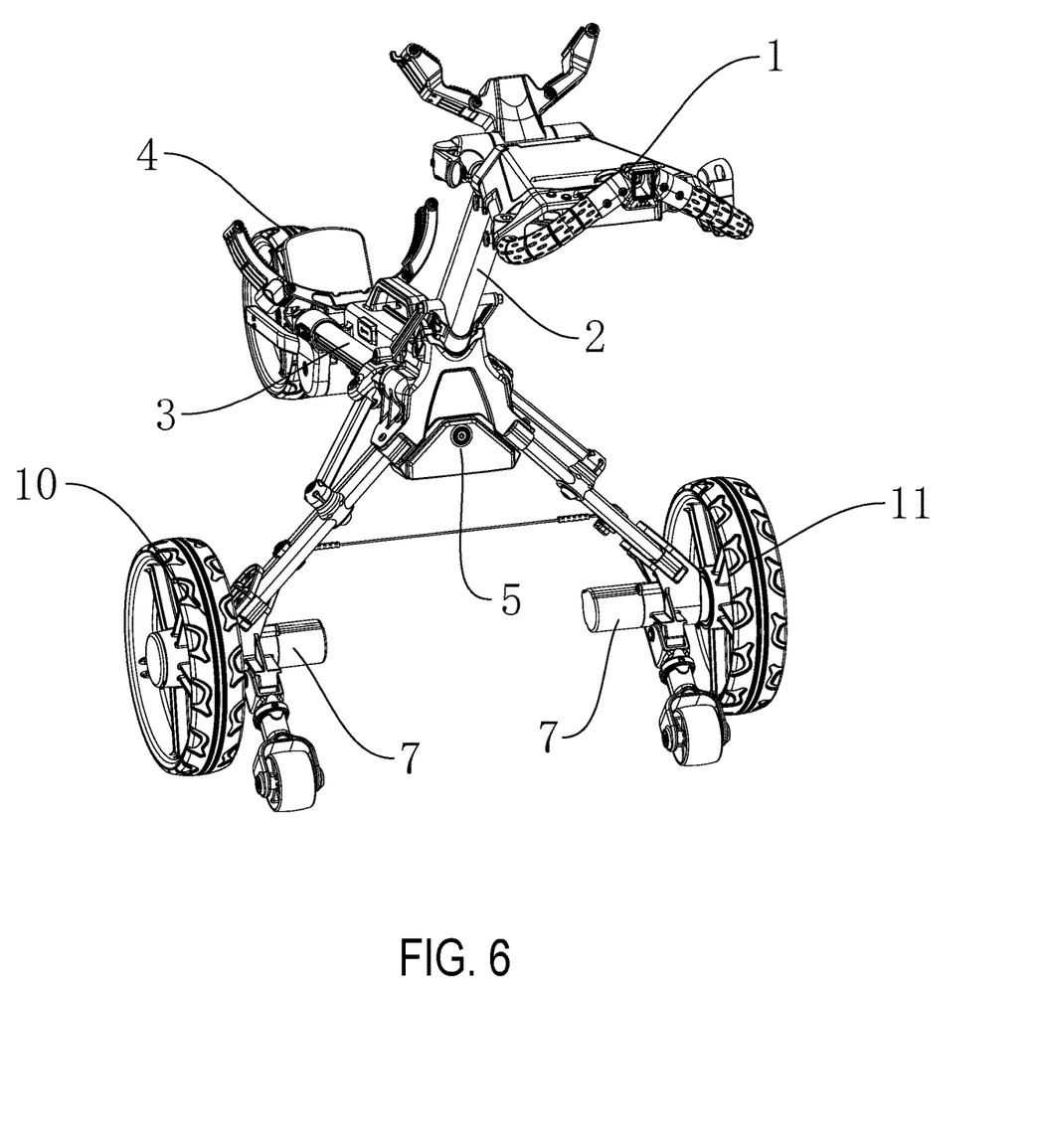
FIG. 6 is a second three-dimensional view of the electric golf trolley in the unfolded state according to the invention.
Figure 7:
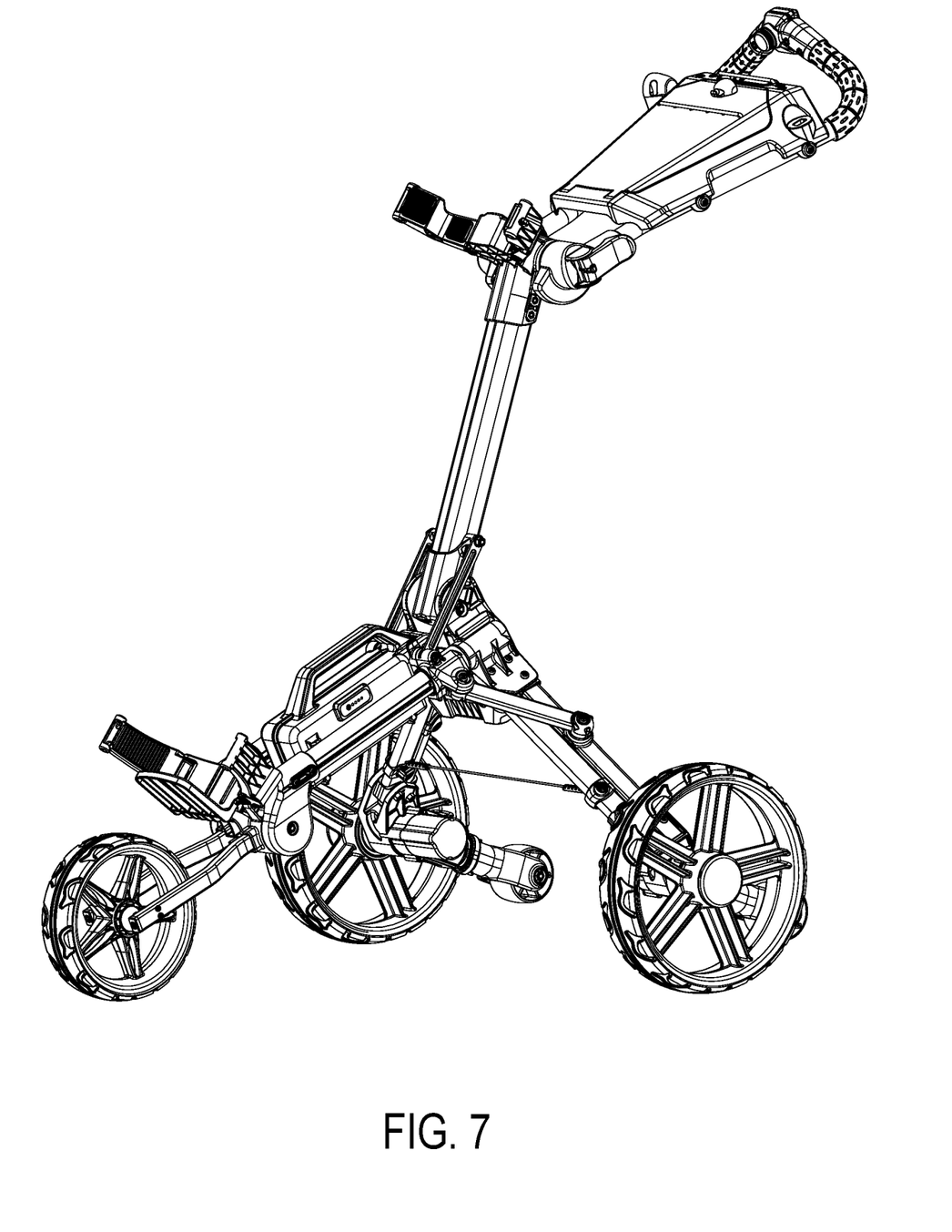
FIG. 7 is a state diagram of the electric golf trolley before folding according to the invention.
Figure 8:
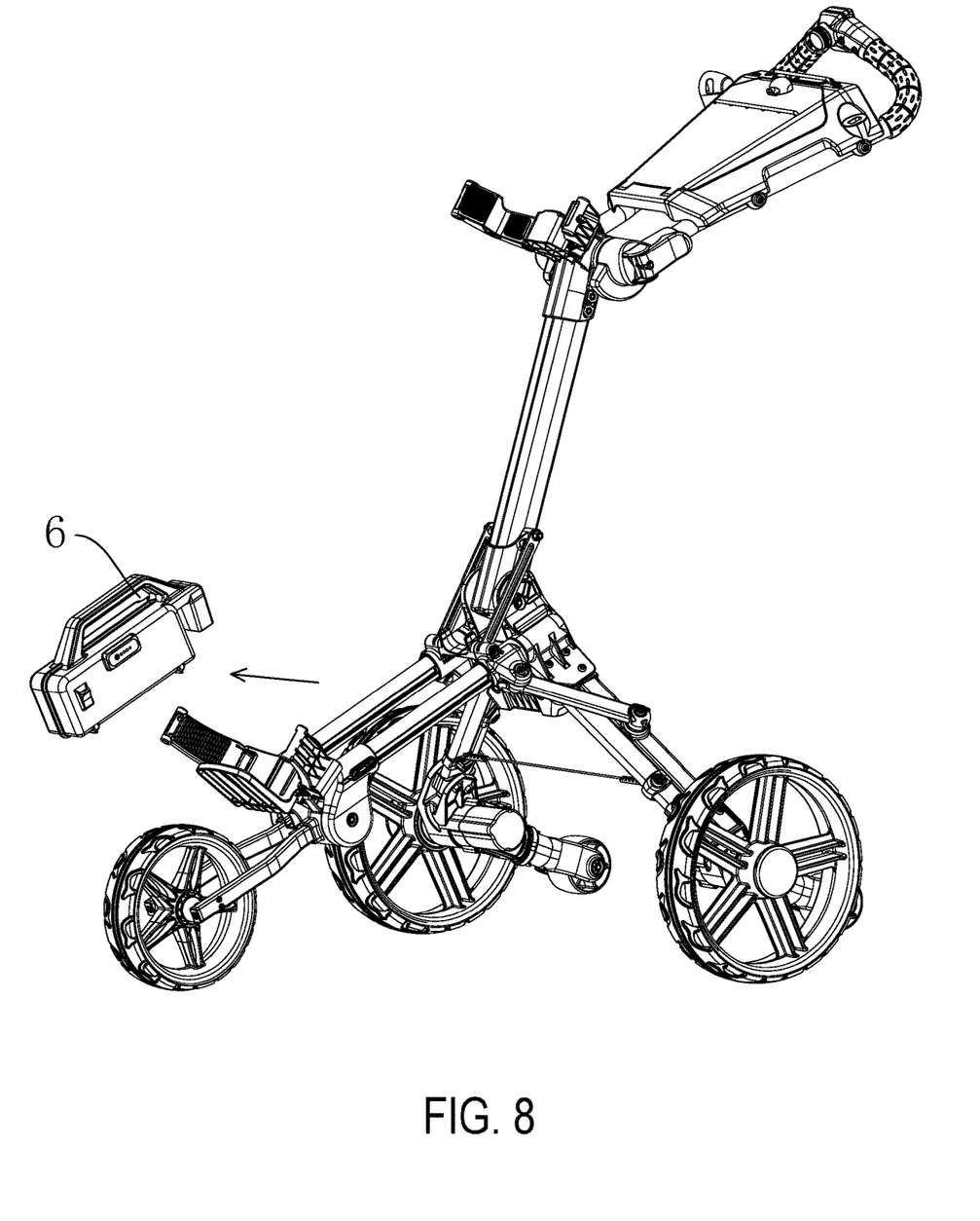
FIG. 8 is a first state diagram of the electric golf trolley during a folding process according to the invention.
Figure 9:
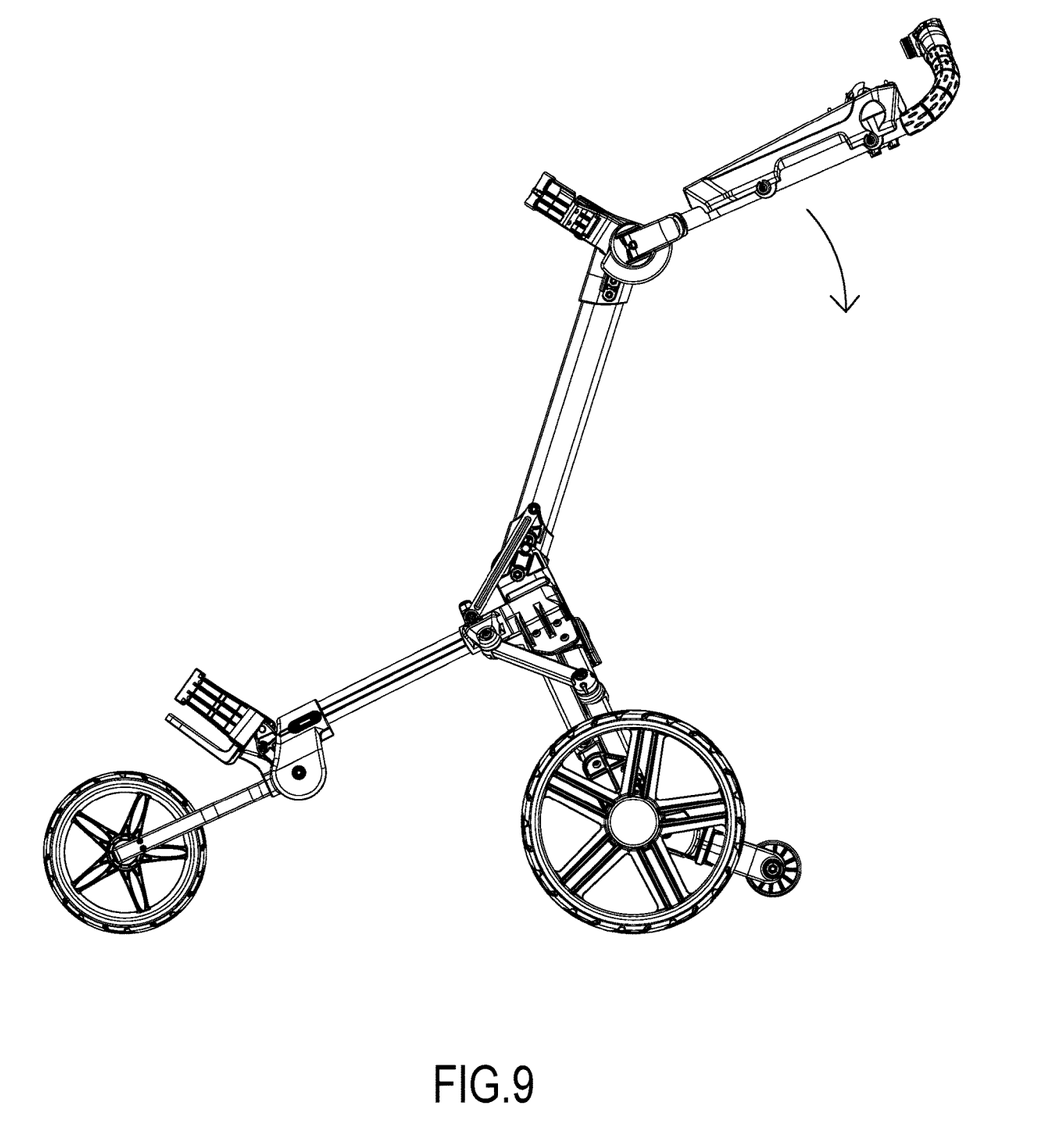
FIG. 9 is a second state diagram of the electric golf trolley during the folding process according to the invention.
Figure 10:
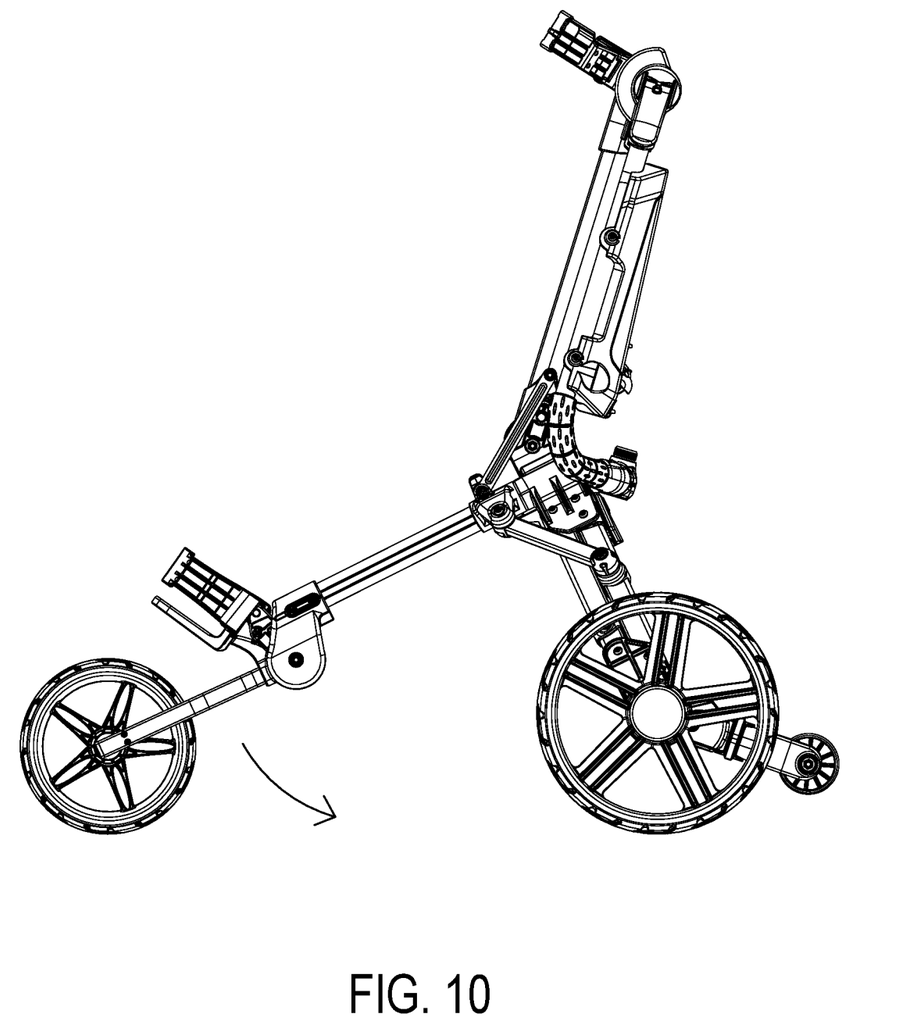
FIG. 10 is a third state diagram of the electric golf trolley during the folding process according to the invention.
Figure 11:
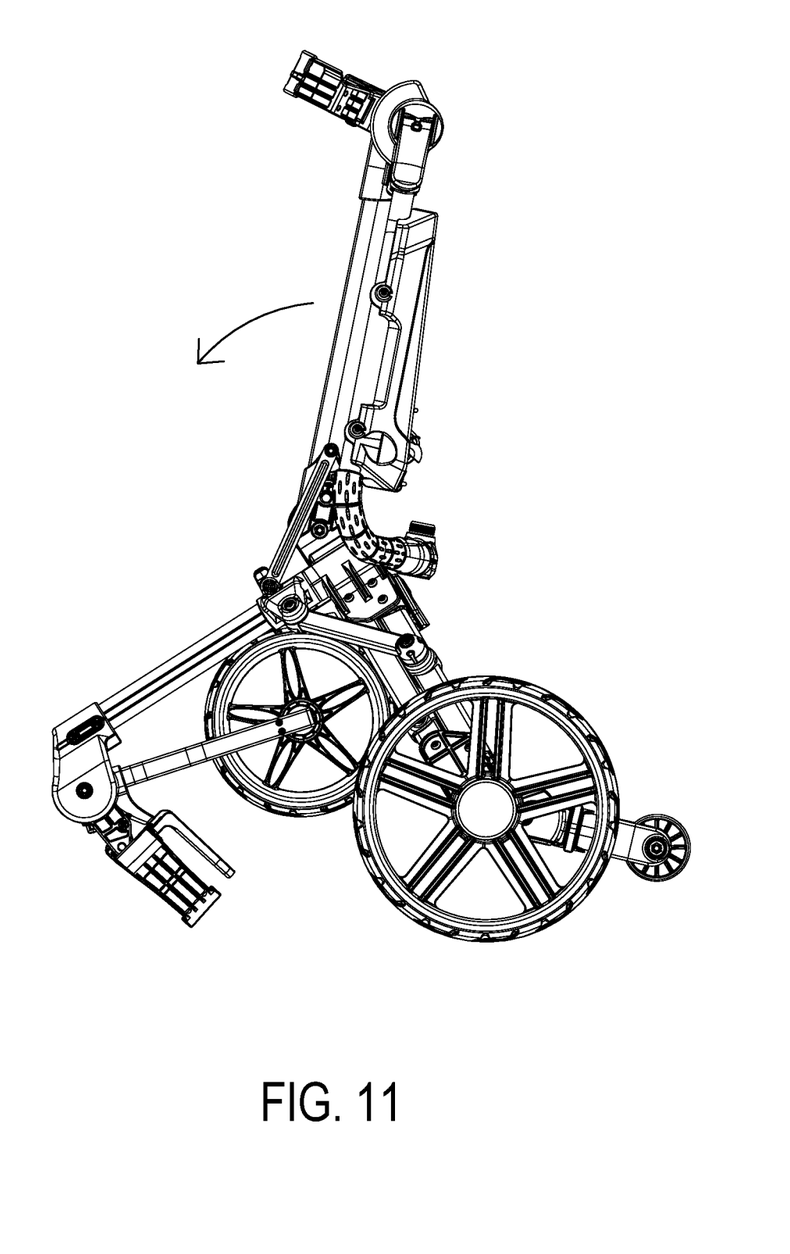
FIG. 11 is a fourth state diagram of the electric golf trolley during the folding process according to the invention.
Figure 12:
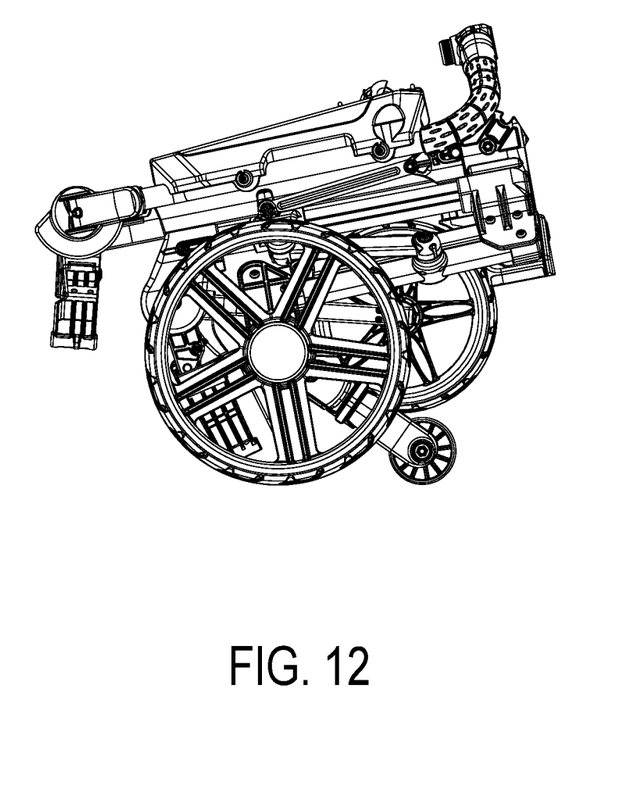
FIG. 12 is a state diagram of the electric golf trolley according to the invention after the folding is completed.

Embodiment is described as follows. As shown in FIG. 5 and FIG. 6, an electric golf trolley comprises an electric actuator, a handlebar module 1, an upper frame module 2, a lower frame module 3, a front wheel module 4, and two rear wheel modules. The upper frame module 2 is mounted on the lower frame module 3 and is able to rotate with respect to the lower frame module 3 under the action of force. The two rear wheel modules are mounted on left and right sides of a rear end of the lower frame module 3 respectively. The handlebar module 1 is mounted at an upper end of the upper frame module 2 through a first locking mechanism. When the first locking mechanism is locked, the handlebar module 1 is fixed on the upper frame module 2. When the first locking mechanism is unlocked, the handlebar module 1 is able to rotate to be folded with respect to the upper frame module 2. The front wheel module 4 is mounted at a front end of the lower frame module 3 and is able to rotate with respect to the lower frame module 3 under the action of force, and a second locking mechanism is disposed between the front wheel module 4 and the lower frame module 3. When the second locking mechanism is locked, the front wheel module 4 is fixed on the lower frame module 3. When the second locking mechanism is unlocked, the front wheel module 4 is able to rotate to be folded with respect to the upper frame module 2.

The electric actuator comprises a motor controller 5, two planetary gear reduction motors 7, and a power supply 6. The power supply 6 is connected to the motor controller 5 and is used for supplying power to the motor controller 5, and the two planetary gear reduction motors 7 are both connected to the motor controller 5, are mounted on the two rear wheel modules in a one-to-one correspondence manner, and are used for driving the two rear wheel modules to rotate. A connecting-rod link mechanism is disposed between the upper frame module 2, the lower frame module 3 and the two rear wheel modules. When the upper frame module 2 is folded towards the lower frame module 3, the upper frame module 2 drives the two rear wheel modules through the connecting-rod link mechanism to be folded synchronously. The motor controller 5 is mounted on the upper frame module 2 or the lower frame module 3, and the power supply 6 is mounted on the upper frame module 2 or the lower frame module 3.

In this embodiment, the connecting-rod link mechanism comprises a slider 8, at least one first connecting rod 9, a left-rear wheel link assembly, and a right-rear wheel link assembly. The slider 8 is mounted on the lower frame module 3 and is able to slide forward and backward on the lower frame module 3 under the action of force. One end of the first connecting rod 9 is mounted on the upper frame module 2 and is able to rotate with respect to the upper frame module 2 under the action of force, and the other end of the first connecting rod 9 is mounted on the slider 8 and is able to rotate with respect to the slider 8 under the action of force. The rear wheel module on the left is called a left-rear wheel module 10, and the rear wheel module on the right is called a right-rear wheel module 11. The left-rear wheel link assembly is used for synchronously folding the left-rear wheel module 10, the right-rear wheel link assembly is used for synchronously folding the right-rear wheel module 11, and the left-rear wheel link assembly and the right-rear wheel link assembly are of a symmetrical structure. The left-rear wheel link assembly comprises a second connecting rod 12, a wheel driving connecting rod 13, and a wheel driven connecting rod 14. One end of the second connecting rod 12 is mounted on the slider 8 and is able to rotate with respect to the slider 8 under the action of force, the other end of the second connecting rod 12 is connected to the wheel driving connecting rod 13 and is able to rotate with respect to the wheel driving connecting rod 13 under the action of force. One end of the wheel driving connecting rod 13 is mounted on the lower frame module 3 and is able to rotate with respect to the lower frame module 3 under the action of force, the other end of the wheel driving connecting rod 13 is mounted on the left-rear wheel module 10 and is able to rotate with respect to the left-rear wheel module 10 under the action of force. One end of the wheel driven connecting rod 14 is mounted on the lower frame module 3 and is able to rotate with respect to the lower frame module 3 under the action of force, and the other end of the wheel driven connecting rod 14 is mounted on the left-rear wheel module 10 and is able to rotate with respect to the left-rear wheel module 10 under the action of force.

In this embodiment, the power supply 6 is a battery pack.

As shown in FIG. 7 to FIG. 12, when the electric golf trolley in this embodiment is folded, the power supply 6 is detached first, then the first locking mechanism and the second locking mechanism are unlocked, the front wheel module 4 is folded towards the lower frame module 3, the handle bar module 1 is folded towards the upper frame module 2 to push the upper frame module 2 to draw close to the lower frame module 3. At this moment, the upper frame module 2 drives the first connecting rod 9 to move to push the slider 8 to move forward, then the slider 8 drives the left-rear wheel link assembly, the right-rear wheel link assembly and the two rear wheel modules to be synchronously folded towards the lower frame module 3, so that the handlebar module 1, the upper frame module 2, the lower frame module 3, the front wheel module 4, and the two rear wheel modules are folded.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. An electric golf trolley, comprising an electric actuator, a handlebar module, an upper frame module, a lower frame module, a front wheel module, and two rear wheel modules,
   wherein the upper frame module is mounted on the lower frame module and is able to rotate with respect to the lower frame module under an action of force, the two rear wheel modules are mounted on left and right sides of a rear end of the lower frame module respectively, and the handlebar module is mounted at an upper end of the upper frame module through a first locking mechanism;
   when the first locking mechanism is locked, the handlebar module is fixed on the upper frame module; when the first locking mechanism is unlocked, the handlebar module is able to rotate to be folded with respect to the upper frame module;
   the front wheel module is mounted at a front end of the lower frame module, the electric actuator comprises a motor controller, two planetary gear reduction motors, and a power supply, the power supply is connected to the motor controller and is configured for supplying power to the motor controller, and the two planetary gear reduction motors are both connected to the motor controller, are mounted on the two rear wheel modules in a one-to-one correspondence manner, and are configured for driving the two rear wheel modules to rotate; and
   a connecting-rod link mechanism is disposed between the upper frame module, the lower frame module and the two rear wheel modules; when folded towards the lower frame module, the upper frame module drives the two rear wheel modules through the connecting-rod link mechanism to be folded synchronously; the motor controller is mounted on the lower frame module, and the power supply is mounted on the lower frame module.

2. The electric golf trolley according to claim 1, wherein the connecting-rod link mechanism comprises a slider, at least one first connecting rod, a left-rear wheel link assembly, and a right-rear wheel link assembly,
   the slider is mounted on the lower frame module and is able to slide forward and backward on the lower frame module under an action of force, the first connecting rod has an end mounted on the upper frame module and being able to rotate with respect to the upper frame module under an action of force, and another end mounted on the slider and being able to rotate with respect to the slider under an action of force,
   the rear wheel module on the left is served as a left-rear wheel module, the rear wheel module on the right is served as a right-rear wheel module, the left-rear wheel link assembly is configured for synchronously folding the left-rear wheel module, the right-rear wheel link assembly is configured for synchronously folding the right-rear wheel module, the left-rear wheel link assembly and the right-rear wheel link assembly are of a symmetrical structure,
   the left-rear wheel link assembly comprises a second connecting rod, a wheel driving connecting rod, and a wheel driven connecting rod, the second connecting rod has an end mounted on the slider and being able to rotate with respect to the slider under an action of force, and another end connected to the wheel driving connecting rod and being able to rotate with respect to the wheel driving connecting rod under an action of force,
   the wheel driving connecting rod has an end mounted on the lower frame module and being able to rotate with respect to the lower frame module under an action of force, and another end mounted on the left-rear wheel module and being able to rotate with respect to the left-rear wheel module under an action of force,
   the wheel driven connecting rod has an end mounted on the lower frame module and being able to rotate with respect to the lower frame module under an action of force, and another end mounted on the left-rear wheel module and being able to rotate with respect to the left-rear wheel module under an action of force.

3. The electric golf trolley according to claim 1, wherein the power supply is a battery pack.

4. The electric golf trolley according to claim 1, wherein a second locking mechanism is disposed between the front wheel module and the lower frame module; when the second locking mechanism is locked, the front wheel module is fixed on the lower frame module; when the second locking mechanism is unlocked, the front wheel module is able to rotate to be folded with respect to the upper frame module.

* * * * *